(12) United States Patent
Kim et al.

(10) Patent No.: US 9,096,757 B2
(45) Date of Patent: Aug. 4, 2015

(54) BIODEGRADABLE POLYMER COMPOSITE MATERIAL

(75) Inventors: Ji Mun Kim, Seoul (KR); Eung Kee Lee, Anyang-si (KR); Min Hee Lee, Gunpo-si (KR); Myeong Hee Kim, Daejeon (KR); Jung Keun Kim, Gunpo-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 13/981,523

(22) PCT Filed: Apr. 17, 2012

(86) PCT No.: PCT/KR2012/002905
§ 371 (c)(1),
(2), (4) Date: Jul. 24, 2013

(87) PCT Pub. No.: WO2012/144781
PCT Pub. Date: Oct. 26, 2012

(65) Prior Publication Data
US 2013/0310506 A1    Nov. 21, 2013

(30) Foreign Application Priority Data

Apr. 18, 2011  (KR) ................. 10-2011-0035911

(51) Int. Cl.
| | | |
|---|---|---|
| *C08L 55/02* | (2006.01) | |
| *C08L 101/16* | (2006.01) | |
| *C08K 5/1539* | (2006.01) | |
| *C08L 67/04* | (2006.01) | |
| *C08K 5/1515* | (2006.01) | |

(52) U.S. Cl.
CPC .............. *C08L 55/02* (2013.01); *C08K 5/1515* (2013.01); *C08K 5/1539* (2013.01); *C08L 67/04* (2013.01); *C08L 101/16* (2013.01); *C08L 2201/06* (2013.01); *C08L 2205/02* (2013.01); *C08L 2205/03* (2013.01)

(58) Field of Classification Search
CPC ....... C08L 55/02; C08L 67/04; C08L 101/00; C08L 23/00; C08L 51/06; C08L 67/02; C08L 77/02; C08L 2666/02
USPC .......... 525/169, 190; 524/398, 403, 431, 502, 524/438
See application file for complete search history.

(56) References Cited

U.S. PATENT DOCUMENTS

| | | | | |
|---|---|---|---|---|
| 6,605,681 | B1 * | 8/2003 | Villalobos et al. | 526/319 |
| 6,984,694 | B2 * | 1/2006 | Blasius et al. | 525/148 |
| 2002/0160201 | A1 * | 10/2002 | Ohkura et al. | 428/413 |
| 2008/0262151 | A1 * | 10/2008 | Ishii et al. | 524/599 |
| 2009/0239433 | A1 * | 9/2009 | Kurihara et al. | 442/164 |
| 2009/0258982 | A1 * | 10/2009 | Kawahara et al. | 524/300 |
| 2009/0306287 | A1 * | 12/2009 | Chung et al. | 524/599 |
| 2010/0105822 | A1 * | 4/2010 | Girioli et al. | 524/398 |
| 2010/0168332 | A1 * | 7/2010 | Chung et al. | 525/71 |
| 2011/0269907 | A1 | 11/2011 | Kumazawa et al. | |

FOREIGN PATENT DOCUMENTS

| | | |
|---|---|---|
| JP | 2008106091 | 5/2008 |
| JP | 2010070628 A | 4/2010 |
| JP | 2010222553 A | 10/2010 |
| KR | 1020000065249 | 11/2000 |
| KR | 1020080039890 | 5/2008 |
| KR | 1020080071109 | 8/2008 |
| KR | 1020100009028 | 1/2010 |
| WO | 9810020 | 3/1998 |
| WO | 2011053627 A2 | 5/2011 |
| WO | WO 2011053627 A2 * | 5/2011 |

OTHER PUBLICATIONS

Jo et al. ("Effects of Compatiblizers on Mechanical Properties of ABS/PLA Composites" Journal of Applied Polymer Science, v 125 S2 E 231-238, Mar. 27, 2012).*
Lohse, et al. (Interfacial Aspects of Multicomponent Polymer Materials, p. 196, Jan. 1997).*
International Search Report mailed Nov. 23, 2012 for PCT/KR2012/002905.
European extended search report dated Jul. 28, 2014.

* cited by examiner

*Primary Examiner* — Randy Gulakowski
*Assistant Examiner* — Christopher M Rodd
(74) *Attorney, Agent, or Firm* — Lowe Hauptman & Ham, LLP

(57) ABSTRACT

The present invention relates to a biodegradable polymer composite material, and more particularly, to a technique for providing a polymer composite material comprising an acrylonitrile-butadiene-styrene (ABS) resin and a biodegradable resin, wherein said polymer composite material has superior impact resistance.

7 Claims, 1 Drawing Sheet

BIODEGRADABLE POLYMER COMPOSITE MATERIAL

CROSS REFERENCE TO RELATED APPLICATION

This application claims the priority of Korean Patent Application No. 10-2011-0035911, filed on Apr. 18, 2011 in the KIPO (Korean Intellectual Property Office). Further, this application is the National Phase application of International Application No. PCT/KR2012/002905 filed on Apr. 17, 2012, which designates the United States and was published in Korean.

TECHNICAL FIELD

The present invention relates to a biodegradable polymer composite, and more particularly, to a technology for providing a polymer composite with high impact strength including an acrylonitrile-butadiene-styrene (ABS) resin and a biodegradable resin.

BACKGROUND ART

In recent years, there has been growing interest in biopolymers. Biopolymers are found in living organisms and are naturally occurring polymers. Biopolymers originating from renewable resources are characterized by biodegradability. Biopolymers can be used in various applications, such as medicines, coatings, food, and packaging materials.

Polylactic acid (PLA), one of the most representative biodegradable resins, is highly transparent and has better heat resistance than other biodegradable resins. Polylactic acid can be mass-produced from vegetable raw materials such as corns and sweet potatoes, which is advantageous in terms of economic efficiency. Polylactic acid can contribute to the reduction of petroleum consumption, thus being considered a very useful polymer.

Conventional polymeric materials using petroleum resources as raw materials release carbon dioxide during incineration after use, resulting in an increase in atmospheric carbon dioxide concentration. In contrast, carbon dioxide emission from polylactic acid during incineration or biodegradation does not bring about an increase in atmospheric carbon dioxide concentration because the concentration of carbon dioxide emitted from polylactic acid is similar to atmospheric carbon dioxide levels.

Due to these advantages, polylactic acid is currently used in disposable products, garbage bags, etc. Polylactic acid is actively investigated for its applicability in various fields of daily life, including exterior materials of electronic products such as air cleaners and mobile phones, furniture such as chairs, and automotive components.

Acrylonitrile-butadiene-styrene (ABS) resins as thermoplastic polymers are used for the manufacture of lightweight products due to their low specific gravity. Other advantages of acrylonitrile-butadiene-styrene (ABS) resins are good molding processability, excellent mechanical properties such as high tensile strength and high impact strength, and superior thermal properties such as high coefficient of thermal expansion and high heat distortion temperature. Particularly, acrylonitrile-butadiene-styrene resins are mainly used as automotive materials and their consumption is steadily on the rise. Under such circumstances, efforts are needed to reduce costs associated with the disposal and incineration of waste acrylonitrile-butadiene-styrene resins.

For this purpose, research is actively underway to impart biodegradability to finished composites by the addition of small amounts of biodegradable resins such as polylactic acid to acrylonitrile-butadiene-styrene (ABS) resins.

However, there is a need to solve the problem of poor compatibility between polylactic acid and acrylonitrile-butadiene-styrene (ABS) resins, which is a cause of low impact strength of composites.

DISCLOSURE

Technical Problem

It is an aspect of the present invention to provide a biodegradable polymer composite that is free from problems associated with poor compatibility, and has high flexibility, good chemical and heat resistance, and excellent mechanical properties.

Technical Solution

In accordance with one aspect of the present invention, a biodegradable polymer composite includes a biodegradable resin, an acrylonitrile-butadiene-styrene (ABS) resin, and a reactive compatibilizer.

In accordance with another aspect of the present invention, a biodegradable polymer composite includes a biodegradable resin, an acrylonitrile-butadiene-styrene (ABS) resin, and a reactive compatibilizer wherein the composite has a phase separation structure in which the biodegradable resin particles form dispersed phases in the acrylonitrile-butadiene-styrene (ABS) resin matrix.

The biodegradable resin may be selected from polylactic acid, polyhydroxybutyrate, polycaprolactone, and mixtures thereof.

The reactive compatibilizer may be selected from glycidyl methacrylate having an epoxy group, maleic anhydride, and mixtures thereof.

The biodegradable resin may be present in an amount of 10 to 40% by weight, based on the total weight of the composite.

The compatibilizer may be present in an amount of 1 to 20% by weight, based on the total weight of the composite.

The composite may have a diameter of 0.1 μm to 5 μm.

The composite may further include at least one additive selected from fillers, softeners, anti-aging agents, heat resistant anti-aging agents, antioxidants, dyes, pigments, catalysts, and dispersants.

Advantageous Effects

The biodegradable polymer composite of the present invention is free from deterioration of physical properties arising from poor compatibility between the biodegradable resin and the acrylonitrile-butadiene-styrene (ABS) resin, thus ensuring high flexibility, good chemical and heat resistance, and excellent mechanical properties.

Therefore, according to the present invention, the utilization of the biodegradable resin can be extended and various environmental regulations can be met. An additional advantage of is that costs associated with subsequent disposal of the materials can be greatly reduced.

MODE FOR INVENTION

Figure 1:
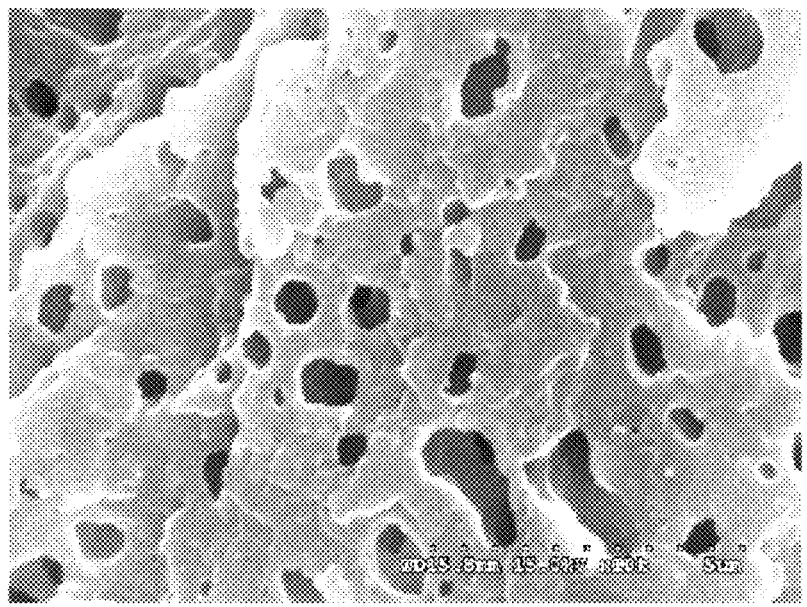
FIG. 1 is a SEM image of a molded article manufactured using a polylactic acid/acrylonitrile-butadiene-styrene (ABS) composite produced in Example 3.

Details of other embodiments will be given in the following description and the accompanying drawings.

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and a thorough understanding of the present invention by those skilled in the art. The scope of the present invention is defined only by the claims. Like components will be denoted by like reference numerals throughout the specification.

Hereinafter, a biodegradable polymer composite of the present invention will be described in more detail.

A biodegradable polymer composite according to one embodiment of the present invention includes (A) a biodegradable resin, (B) an acrylonitrile-butadiene-styrene (ABS) resin, and (C) a reactive compatibilizer.

Now, a detailed description will be given of the individual components included in the biodegradable polymer composite.

(A) Biodegradable Resin

The biodegradable resin refers to a resin that is completely degraded into water, carbon dioxide, and slight amounts of inorganic salts by microorganisms present in nature.

The amount of the biodegradable resin used in the present invention varies depending on desired biomass content and physical properties. The biodegradable resin is preferably used in an amount ranging from 10 to 40% by weight, based on the total weight of the composite. If the content of the biodegradable resin is less than 10% by weight, poor biodegradability of the composite is caused. Meanwhile, if the content of the biodegradable resin exceeds 40% by weight, the limited contents of the acrylonitrile-butadiene-styrene (ABS) resin and the reactive compatibilizer make it difficult to achieve desired mechanical properties of the composite and particularly bring about a drastic reduction in the impact strength of the composite.

The biodegradable resin is not particularly limited so long as the requirements specified above are met. Particularly, the biodegradable resin may be selected from the group consisting of polylactic acid, polyhydroxybutyrate, polycaprolactone, and mixtures thereof.

Particularly preferred is polylactic acid that has high mechanical strength and can be produced in a simpler manner than other biodegradable resins.

Polylactic acid is a polyester resin prepared by esterification of lactic acid as a monomer and has the structure of Formula 1.

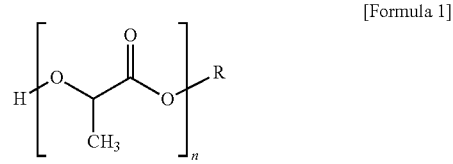

[Formula 1]

Polylactic acid used in the present invention includes a repeating unit derived from the L-isomer of lactic acid, a repeating unit derived from the D-isomer of lactic acid, or repeating units derived from the L- and D-isomers of lactic acid. These repeating units may be used alone or in combination.

The use of polylactic acid including 95% by weight or more of the repeating unit derived from the L-isomer of lactic acid is preferred in terms of heat resistance and moldability. The use of polylactic acid including 95 to 100% by weight of the repeating unit derived from the L-isomer of lactic acid and 0 to 5% by weight of the repeating unit derived from the D-isomer of lactic acid is more preferred in terms of resistance to hydrolysis.

(B) Acrylonitrile-butadiene-styrene (ABS) Resin

The acrylonitrile-butadiene-styrene (ABS) resin is a terpolymer resin composed of an acrylonitrile (AN) monomer, a butadiene (BD) monomer, and a styrene monomer (SM), and has the structure of Formula 2.

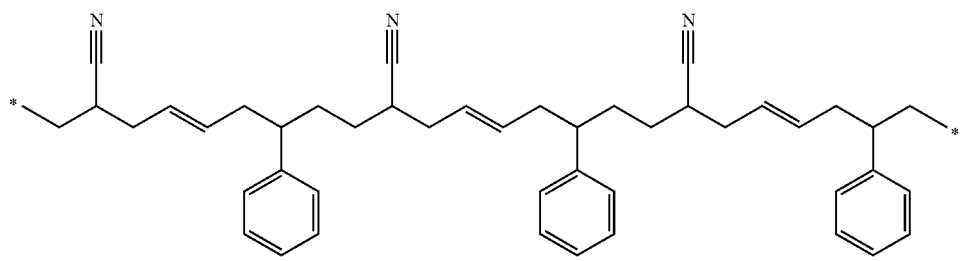

[Formula 2]

The acrylonitrile-butadiene-styrene (ABS) resin can be developed into various forms by varying the relative proportions of the three major monomers, reinforcing with a variety of pigments and additives, adding heat resistant agents, adding flame retardants, adjusting the molecular weight thereof, etc.

The acrylonitrile-butadiene-styrene (ABS) resin is generally prepared by mixing a copolymer of acrylonitrile and butadiene with a copolymer of styrene and butadiene. In this case, the acrylonitrile-butadiene-styrene (ABS) resin includes both copolymers. The performance of the product is dependent on the composition of the components of the copolymers. Accordingly, the composition of the acrylonitrile-butadiene-styrene (ABS) resin used in the present invention may vary depending on intended application.

The acrylonitrile-butadiene-styrene (ABS) resin is preferably used in an amount ranging from 40 to 89% by weight, based on the total weight of the composite.

The presence of the acrylonitrile-butadiene-styrene (ABS) resin in an amount of less than 40% by weight makes it difficult to obtain intended impact and heat resistance. Meanwhile, the presence of the acrylonitrile-butadiene-styrene (ABS) resin in an amount exceeding 89% by weight causes poor biodegradability.

(C) Reactive Compatibilizer

When compatibilizers are added during melt mixing of polymers, functional groups introduced in the compatibilizers chemically react with the polymers. This reaction enables good blending of the polymers.

Compatibilizers are classified into two types: non-reactive compatibilizers and reactive compatibilizers. Non-reactive compatibilizers make use of their physical properties only and reactive compatibilizers react during extrusion.

Random copolymers, graft copolymers, block copolymers, etc. are the most widely used non-reactive compatibilizers. In many cases, reactive compatibilizers are prepared by bonding reactive groups to non-reactive compatibilizers.

Such reactive groups include, for example, maleic anhydride, epoxy, and carbonyl groups. Most of these reactive groups are bonded to the ends or sides of non-reactive compatibilizers.

Preferably, the reactive compatibilizer included in the biodegradable polymer composite of the present invention has a reactive group. The reactive group is particularly an epoxy group.

Any compatibilizer having an epoxy group as a reactive group may be used without limitation in the present invention. When the physical properties of the composite are taken into consideration, the compatibilizer is preferably selected from glycidyl methacrylate, maleic anhydride, and mixtures thereof.

Glycidyl methacrylate and maleic anhydride have the structures of Formulae 3 and 4, respectively.

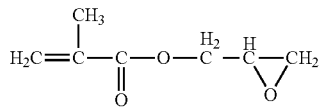

[Formula 3]

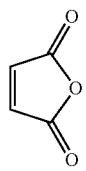

[Formula 4]

Glycidyl methacrylate or maleic anhydride enhances the compatibility of the biodegradable resin and the acrylonitrile-butadiene-styrene (ABS) resin to achieve improved mechanical strength such as tensile strength and impact strength.

Glycidyl methacrylate or maleic anhydride moderates the differences in the properties of the biodegradable resin and the acrylonitrile-butadiene-styrene (ABS) resin to allow the composite to have a stable microphase separation structure.

That is, glycidyl methacrylate or maleic anhydride acts as a bridge between the biodegradable resin and the acrylonitrile-butadiene-styrene (ABS) resin to reduce interfacial tension therebetween, achieving improved compatibility.

The epoxy group of glycidyl methacrylate undergoes reaction through ring-opening, and the oxygen atom in the ring structure of maleic anhydride undergoes a substitution reaction while maintaining the ring structure.

The compatibilizer is preferably used in an amount of 1 to 20% by weight, more preferably 1 to 7% by weight, based on the total weight of the composite.

If the compatibilizer is used in an amount of less than 1% by weight, sufficient enhancement of compatibility is not obtained, causing poor mechanical properties of the product. Meanwhile, if the compatibilizer is used in an amount exceeding 20% by weight, excessively thick interfaces are formed between the polymers, and as a result, the interfacial bonding between the biodegradable resin and the acrylonitrile-butadiene-styrene (ABS) resin is reduced, causing poor mechanical properties.

A biodegradable polymer composite according to another embodiment of the present invention includes a biodegradable resin, an acrylonitrile-butadiene-styrene (ABS) resin, and a reactive compatibilizer wherein the composite has a phase separation structure in which the biodegradable resin particles form dispersed phases in the acrylonitrile-butadiene-styrene (ABS) resin matrix.

The phase separation structure includes a matrix of the acrylonitrile-butadiene-styrene (ABS) resin and dispersed phases of the biodegradable resin particles. The dispersed phases are formed in the matrix.

Glycidyl methacrylate or maleic anhydride as the compatibilizer plays a role in firmly adhering the acrylonitrile-butadiene-styrene (ABS) resin matrix phase to the biodegradable resin particles. Another role of the compatibilizer is to block coalescence of the biodegradable resin particles. The roles of the compatibilizer allow uniform dispersion of the dispersed phases of the fine-sized biodegradable resin particles in the acrylonitrile-butadiene-styrene (ABS) resin matrix phase.

The dispersed phases of the biodegradable resin particles have a diameter of 0.1 to 20 μm, preferably 0.1 to 5 μm. The fine and uniform sized dispersed phases improve compatibility between the biodegradable resin and the acrylonitrile-butadiene-styrene (ABS) resin. As a result, the bonding strength of the composite is enhanced, demonstrating an improvement in mechanical properties, particularly impact strength.

The composite of the present invention may further include at least one additive selected from fillers, softeners, anti-aging agents, heat resistant anti-aging agents, antioxidants, dyes, pigments, catalysts, and dispersants.

The biodegradable resin composite of the present invention can be produced by the above procedure. In the following examples, including comparative examples, biodegradable resin composites according to embodiments of the present invention and comparative composites were produced and evaluated.

Production of Biodegradable Resin Composites

Examples and Comparative Examples

Example 1

An ABS resin, a PLA resin, and ethylene-octene-rubber-maleic anhydride (EOR-MAH) as a compatibilizer were separately dried in a vacuum oven at 70° C. for 24 h. 90 g of the dried ABS resin was mixed with 10 g of the dried PLA resin. Then, the polymer resin mixture was mixed with 1 g of the dried compatibilizer EOR-MAH. The resulting mixture was fed into a co-rotating twin-screw extruder and melt-extruded at a rate of 120 rpm at a temperature of 220° C., affording an ABS/PLA composite.

Example 2

An ABS/PLA composite was produced in the same manner as in Example 1, except that 2 g of the compatibilizer, EOR-MAH, was used.

Example 3

An ABS/PLA composite was produced in the same manner as in Example 1, except that 60 g of the ABS resin and 40 g of the dried PLA resin were mixed, and then the polymer resin mixture was mixed with 1 g of the dried compatibilizer EOR-MAH.

Example 4

An ABS/PLA composite was produced in the same manner as in Example 3, except that 5 g of the compatibilizer, EOR-MAH, was used.

Example 5

An ABS/PLA composite was produced in the same manner as in Example 1, except that 1 g of ethylene glycidyl methacrylate (EGMA) as a compatibilizer was used.

Example 6

An ABS/PLA composite was produced in the same manner as in Example 3, except that 7 g of EGMA as a compatibilizer was used.

Example 7

An ABS resin, a PHB resin, and styrene-maleic anhydride (styrene-MAH) as a compatibilizer were separately dried in a vacuum oven at 70° C. for 24 h. 90 g of the dried ABS resin was mixed with 10 g of the dried PHB resin. Then, the polymer resin mixture was mixed with 2 g of the dried compatibilizer styrene-MAH. The resulting mixture was fed into a co-rotating twin-screw extruder and melt-extruded at a rate of 120 rpm at a temperature of 220° C., affording an ABS/PHB composite.

Example 8

An ABS/PHB composite was produced in the same manner as in Example 7, except that 5 g of the compatibilizer, styrene-MAH, was used.

Example 9

An ABS resin, a PCL resin, and glycidyl methacrylate (GMA) as a compatibilizer were separately dried in a vacuum oven at 70° C. for 24 h. 60 g of the dried ABS resin was mixed with 40 g of the dried PCL resin. Then, the polymer resin mixture was mixed with 2 g of the dried compatibilizer GMA. The resulting mixture was fed into a co-rotating twin-screw extruder and melt-extruded at a rate of 120 rpm at a temperature of 220° C., affording an ABS/PCL composite.

Example 10

An ABS/PCL composite was produced in the same manner as in Example 9, except that 5 g of the compatibilizer, GMA, was used.

Comparative Example 1

The procedure of Example 1 was repeated except that the ABS resin only was used.

Comparative Example 2

An ABS/PLA composite was produced in the same manner as in Example 1, except that the compatibilizer was not used.

Comparative Example 3

An ABS/PLA composite was produced in the same manner as in Example 3, except that the compatibilizer was not used.

Evaluations

Experimental Example 1

Measurement of Impact Strength

Each of the biodegradable composites produced in Examples 1-10 and Comparative Examples 1-3 was injection molded and cut into a specimen having a size of 75 mm (w)×12.5 mm (1)×3 mm (h). The Izod impact strengths of the specimens were measured at room temperature in accordance with ASTM D-256. The results are shown in Table 1.

TABLE 1

| | Polymer composite (wt %) | | Compatibilizer content (wt %) | | | | Impact strength |
|---|---|---|---|---|---|---|---|
| Example No. | ABS resin | Biodegradable resin | EOR-MAH | EGMA | Styrene-MAH | GMA | (Kgf · cm/cm) |
| Example 1 | 90 | PLA 10 | 1 | 0 | 0 | 0 | 20.0 |
| Example 2 | 90 | PLA 10 | 2 | 0 | 0 | 0 | 20.2 |
| Example 3 | 60 | PLA 40 | 1 | 0 | 0 | 0 | 14.5 |
| Example 4 | 60 | PLA 40 | 5 | 0 | 0 | 0 | 10.1 |
| Example 5 | 90 | PLA 10 | 0 | 1 | 0 | 0 | 18.0 |
| Example 6 | 60 | PLA 40 | 0 | 7 | 0 | 0 | 7.8 |
| Example 7 | 90 | PHB 10 | 0 | 0 | 2 | 0 | 22 |
| Example 8 | 90 | PHB 10 | 0 | 0 | 5 | 0 | 11 |
| Example 9 | 60 | PCL 40 | 0 | 0 | 0 | 2 | 16.5 |
| Example 10 | 60 | PCL 40 | 0 | 0 | 0 | 5 | 19.8 |

TABLE 1-continued

| Example No. | Polymer composite (wt %) | | Compatibilizer content (wt %) | | | | Impact strength (Kgf · cm/cm) |
| --- | --- | --- | --- | --- | --- | --- | --- |
| | ABS resin | Biodegradable resin | EOR-MAH | EGMA | Styrene-MAH | GMA | |
| Comparative Example 1 | 100 | 0 | 0 | 0 | 0 | 0 | 21.0 |
| Comparative Example 2 | 90 | 10 | 0 | 0 | 0 | 0 | 7.8 |
| Comparative Example 3 | 60 | 40 | 0 | 0 | 0 | 0 | 5.2 |

As can be seen from the results in Table 1, the composites of Comparative Examples 2-3 using none of the compatibilizers had very low impact strengths. These results are because there is no compatibility between the ABS resin and the PLA resin.

The impact strengths of the ABS/PLA composites of Examples 1-4 using EOR-MAH as a compatibilizer and the ABS/PLA composites of Examples 5-6 using EGMA as a compatibilizer were compared with those of the composites of Comparative Examples 2-3 using none of the compatibilizers. As a result of the comparison, the composites of Examples 1 to 10 had higher impact strengths than the composites of Comparative Examples 2 and 3.

Experimental Example 2

Observation by Scanning Electron Microscopy

Each of the composites of Examples 1-10 and Comparative Examples 1-3 was processed into a specimen having a size of 75 mm (w)×12.5 mm (1)×3 mm (h) using an injection molding machine. After the specimens were immersed in liquid nitrogen, the frozen specimens were fractured. The fractured surfaces of the specimens were etched with an ethylene amide solution. The morphological properties of the composites were observed under a scanning electron microscope.

Figure 2:
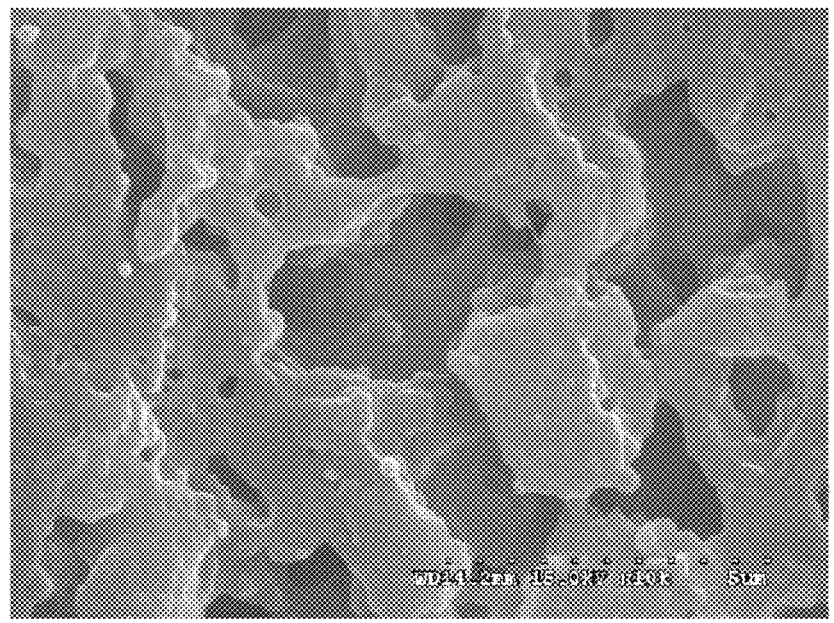
FIG. 2 is a SEM image of a molded article manufactured using a polylactic acid/acrylonitrile-butadiene-styrene (ABS) composite produced in Comparative Example 3.

Scanning electron micrographs of the composites of Example 3 and Comparative Example 3 are shown in FIGS. 1 and 2, respectively.

Referring to FIGS. 1 and 2, the dispersed phases of the ABS/PLA composite of Comparative Example 3 using no compatibilizer (FIG. 2) were larger than those of the composite of Example 1 using the compatibilizer (FIG. 1).

The results of Experimental Examples 1-2 confirm the fact that the presence of the reactive compatibilizer in the composite of the present invention increases compatibility between the ABS resin and the PLA resin, leading to high impact strength of the composite.

Although some embodiments have been described herein, it will be understood by those skilled in the art that these embodiments are provided for illustration only, and various modifications, changes, alterations and equivalent embodiments can be made without departing from the scope of the present invention. Therefore, the scope and sprit of the present invention should be defined only by the accompanying claims and equivalents thereof.

While the present invention has been described with reference to the specific embodiments and drawings, it should be understood that the present invention is not limited to the embodiments and those skilled in the art can make changes and modifications to the embodiments from the description. Therefore, the spirit of the invention should be determined only by the following claims, and all equivalents or equivalent modifications of the claims come within the spirit of the invention.

The invention claimed is:

1. A biodegradable polymer composite comprising:
   a polylactic acid;
   an acrylonitrile-butadiene-styrene (ABS) resin; and
   a compatibilizer,
   wherein the compatibilizer comprises a reactive compatibilizer and a non-reactive compatibilizer,
   wherein the reactive compatibilizer has a reactive group bonded to the non-reactive compatibilizer,
   wherein the composite has a phase separation structure in which the polylactic acid particles form dispersed phases in the acrylonitrile-butadiene-styrene (ABS) resin matrix,
   wherein the compatibilizer is present in an amount ranging from 1% to 20% by weight, based on total weight of the composite, and
   wherein the dispersed phases of the polylactic acid particles in the composite have a diameter of 0.1 to 20 μm,
   wherein the reactive compatibilizer comprises maleic anhydride.

2. The biodegradable polymer composite according to claim 1, wherein the reactive compatibilizer further comprises glycidyl methacrylate.

3. The biodegradable polymer composite according to claim 1, wherein the polylactic acid is present in an amount of 10 to 40% by weight, based on total weight of the composite.

4. The biodegradable polymer composite according to claim 1, further comprising an additive.

5. The biodegradable polymer composite according to claim 4, wherein the additive is selected from the group consisting of fillers, softeners, anti-aging agents, heat resistant anti-aging agents, antioxidants, dyes, pigments, catalysts, dispersants, and mixture thereof.

6. The biodegradable polymer composite according to claim 1, wherein the acrylonitrile-butadiene-styrene (ABS) resin is present in an amount of 40 to 89% by weight, based on total weight of the composite.

7. The biodegradable polymer composite according to claim 1, wherein the non-reactive compatibilizer is selected from at least one of the group consisting of random copolymers, graft copolymers, and block copolymers.

\* \* \* \* \*